United States Patent [19]

Tschudin-Mahrer

[11] Patent Number: 4,837,064
[45] Date of Patent: Jun. 6, 1989

[54] TRANSPORT ROLLER

[75] Inventor: Rolf Tschudin-Mahrer, Lausen, Fed. Rep. of Germany

[73] Assignee: Irbit Research & Consulting AG, Fribourg, Switzerland

[21] Appl. No.: 139,465

[22] Filed: Dec. 30, 1987

[30] Foreign Application Priority Data

Jan. 7, 1987 [DE] Fed. Rep. of Germany ... 8700258[U]

[51] Int. Cl.$^4$ ............................ B32B 3/26; B32B 7/04
[52] U.S. Cl. ....................................... 428/71; 29/116.1; 198/835; 198/842; 428/36; 428/76; 428/188; 428/306.6; 428/308.4; 428/309.9; 428/318.6; 428/319.3; 428/36.5
[58] Field of Search ..................... 428/36, 304.4, 306.6, 428/308.4, 309.9, 310.5, 315.5, 315.7, 315.9, 71, 76, 188, 318.6, 319.3, 319.7; 29/116.1; 198/835, 842, 843

[56] References Cited

U.S. PATENT DOCUMENTS

| 2,157,096 | 5/1939 | Greenup | 428/315.5 |
| 2,354,430 | 7/1944 | Greenup et al. | 428/308.4 |
| 2,594,348 | 4/1952 | Rockoff | 428/318.6 |
| 3,511,738 | 5/1970 | McGuire | 428/71 |
| 3,711,912 | 1/1973 | Teske et al. | 29/116.1 |
| 4,287,649 | 9/1981 | Kohler | 29/130 |
| 4,552,601 | 11/1985 | Hirano et al. | 428/71 |
| 4,707,408 | 11/1987 | Iwasawa et al. | 428/36 |

Primary Examiner—William J. Van Balen
Attorney, Agent, or Firm—Martin A. Farber

[57] ABSTRACT

The present invention relates to a transport roller consisting of elastic material with a rotation shaft of nonelastic material located in a central cavity. In order to optimize the functional properties such as degree of elasticity, resistance to wear and mechanical load-bearing capacity, the roller body (1), which consists of open-cell foam, is closed on its surface by a skin (2) of resilient material which forms an outer surface of the roller and anchors itself by engagement in the foam pores (7).

6 Claims, 3 Drawing Sheets

TRANSPORT ROLLER

FIELD AND BACKGROUND OF THE INVENTION

The present invention relates to a transport roller of elastic material with a rotation shaft of non-elastic material located in a central cavity of the rollers.

It is known to produce transport rollers of open-cell foam disposed completely throughout a roller. In such case, however, the wear factor is rather high. On the other hand, it is known to use compact harder material, for instance rubber, polyurethane elastomer, silicone, etc. for the manufacture of the transport rollers. In such case, however, the required friction values are not obtained in all cases. Generally there is slippage.

SUMMARY OF THE INVENTION

The object of the present invention is to create a transport roller of the type which, while having a high degree of elasticity, is optimized with respect to its wear properties and mechanical load-carrying capacity.

According to the invention this object is achieved by a roller body (1) formed of open-cell foam which is closed on the foam surface by a skin (2) of resilient material, the skin forming the cylindrical surface of the roller and being anchored by engagement into pores (7) of the foam.

As a result of this development, a transport roller of the type is obtained which is characterized by a more favorable pressure-deformation behavior and which, at the same time, has a considerably improved wear behavior. By the advantageous soft-foam core and harder skin there is obtained practically an externally armored roller body. Its comparatively thin skin can be better adapted to specific requirements. Since only a comparatively small amount of material is required for the skin, the desired special properties of the surface can be established individually without great expense, for instance an anti-static electrically conductive coating, etc. Furthermore, various factors can be taken into consideration with respect to a flame-resistant finish, entirely aside from specific colors. In particular, however, the coefficients of friction (COF) can be influenced or established by a suitable selection of the outer skin, independently of the material of the center of the roll. In the case of light, soft foams one can have recourse to esters, ethers, polyurethane, polyethylene, silicone or the like, subject to a good fine-cell nature of the material (from about 30 PPI). By the selection of suitable combinations of material, a high resistance to temperature can furthermore be obtained. The skin can be so dense that the penetration of liquid, particularly toner ink, etc. into the core-forming open-cell foam is effectively prevented. On the other hand, without the use of adhesive an intimate bond is present between the applied skin of resilient material and the foam structure in that the back of the skin is anchored in the foam pores. Even intensive milling forces of the transport roller cannot destroy this anchoring.

The skin, whch is in the form of a closed cover layer, has a thickness of between 0.1 and 3.0 mm depending on the field of use, diameter of the roller, etc. With such thin coatings the pressure-deformation behavior and resiliency can be optimally achieved, but with greater resistance to wear. As a result of the partial elastic yielding a larger contact surface is obtained and thus a far more dependable transport; the forces of radial compression pass over into a transversely directed, essentially local component of extension. Furthermore, it is advantageous that the open-cell foam consist of polyurethane and have a resistance to compression set (DIN 53 577, 40%) of 15–30 kPa and that the skin consist of polyurethane of a Shore A hardness of 73–83 and an elongation at rupture of 400%. Finally, another advantageous feature of the invention resides in the fact that the depth of anchoring of the skin in the foam pores is approximately equal to the thickness of the skin. Spraying proves to be a successful method of applying the skin in the case of liquid components. On the other hand, attachment by pouring is also advantageous as well as rolling on or scraping on. The foregoing application of skin need not be limited to the cylindrical surface of a transport roll; rather, depending on the purpose of use, as in the case of an inking device, the ends of the roller as well as the cavity which receives the rotation shaft have a corresponding coating. The skin may be applied in such a manner that the elastic core of the transport roller is hermetically closed like an air cushion or pneumatic tire, with the foam structure as filling. Thus no liquid can pass into the foam, which would result in partial neutralization. The air which is passed through the pores upon the contact deformation is displaced without hindrance.

BRIEF DESCRIPTION OF THE DRAWINGS

With the above and other objects and advantages in view, the present invention will become more clearly understood in connection with the detailed description of a preferred embodiment, when considered with the accompanying drawing, of which:

FIG. 4 is an enlarged section through the edge portion of the transport roller showing the anchoring of the skin in the peripheral pores of the open-cell foam material.

DETAILED DESCRIPTION OF THE PREFERRED EMBODIMENT

Figure 1:
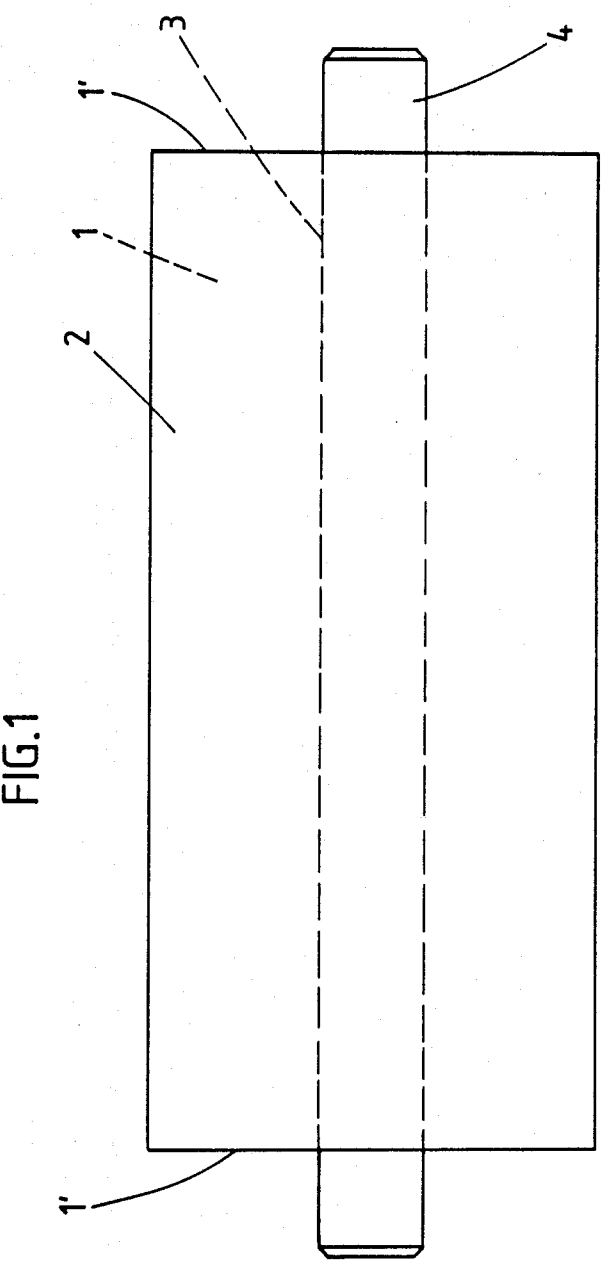
FIG. 1 shows a transport roller developed in accordance with the invention, seen in side view.
Figure 2:
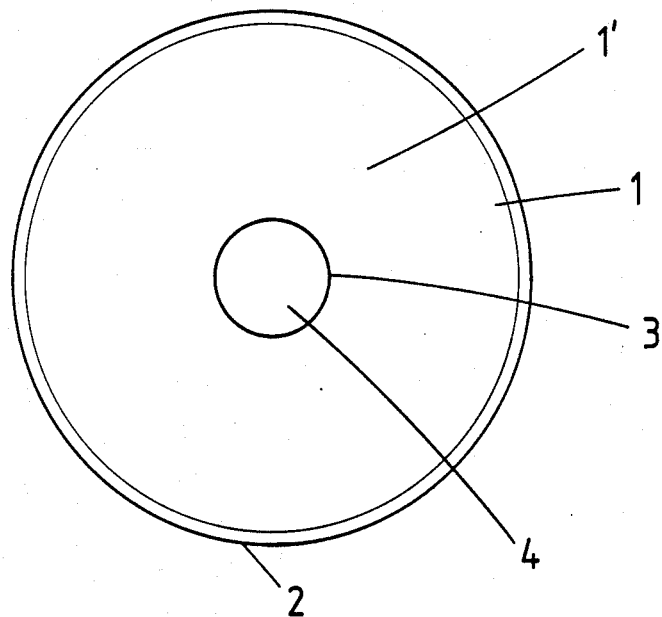
FIG. 2 shows same in end view.

The transport roller shown has a roller body 1 consisting of open-cell soft foam. At least its cylindrical surface bears a skin 2 of resilient material.

With respect to the open-cell foam, recourse is had, for instance, to polyurethane of a resistance to compression set of 15 to 30 kPa. In the field of light, soft foams, ester/ether polyethylene, silicone, etc. also suitable. In this connection a good fine-cell character of the material is taken as basis (as from about 30 PPI).

A more wear-resistant skin 2 which is harder than this consists also of polyurethane of a Shore A hardness of 73 to 83 and an elongation at rupture of 400%.

When using a liquid skin-forming coating, spraying is employed as manner of application. On the other hand, however, pouring is also possible, as is scraping-on or rolling. In all of these cases, such a high-grade closed character of the skin can be obtained that liquid cannot penetrate through the wall of the shell coated in this manner. Upon corresponding use, in which the penetration of liquid into the open-cell foam of the roll body is generally to be avoided, it is advisable also to close the two annular end surfaces 1' of the cylindrically shaped roll body 1. The central cavity 3 can also be included, it receiving a shaft 4 of non-elastic material which is attached fixed for rotation to the roller body 1.

By suitable coating on all sides, a hermetic closure is obtained. Such a roller body therefore acts like a softly filled "cushion." The enclosed foam acts as readily resilient, always rapidly recovering its shape by filling a depression produced by contact with a surface. With reference hereto, see the situation of application of the roller shown in FIG. 3. An elasticity effect is then present, consisting both of the corresponding properties of the foam and of a pneumatic elasticity effect.

The attachment of the skin 2 to the roller body 1, which can be obtained without the use of adhesives, is particularly stable due to the engagement of the skin-forming material in the open-cell foam structure. This can be clearly noted from FIG. 4. While the outer surface 2' of the skin 2 is smoothly curved, the inner surface 2" which covers the porous outer wall of the honeycomb body 1 is extended by skin projections 6 which extend roller-inward therein. They anchor themselves in the pores 7 of the foam structure 8. The foam pores 7 are of different shapes. Depending on the section they widen considerably on the structure side. Thus undercut surfaces 7' are produced. Since adjacent pores 7 are connected to each other also by transverse shafts as a result of the continuous open-cell structure, there are obtained in part coherent skin-anchoring loops. As a whole, a high degree of stable anchoring of the skin 2 is obtained, possibly supported furthermore by a certain effect of adherence of the two materials to each other.

The thickness of the skin is preferably within an order of magnitude of 0.1 to 3.0 mm, depending on the size of the roller and the specific purpose of use. In this connection the depth of anchoring x of the skin 2 in the foam pores 8 is approximately equal to the thickness y of the skin. Coming back to the case of use of the transport roll shown in FIG. 3, there takes place a radially directed compression with the displacement of a section of the roll having the shape of a circular segment and which distributes itself laterally to the radius R, with the formation of equalization components designated by the arrows 9. The ideal circumferential section of the transport roll is designated 10. The ends of the section of circular-segment shape each pass into a bulge 11, which bulges in practice further increase the contact surface.

Figure 3:
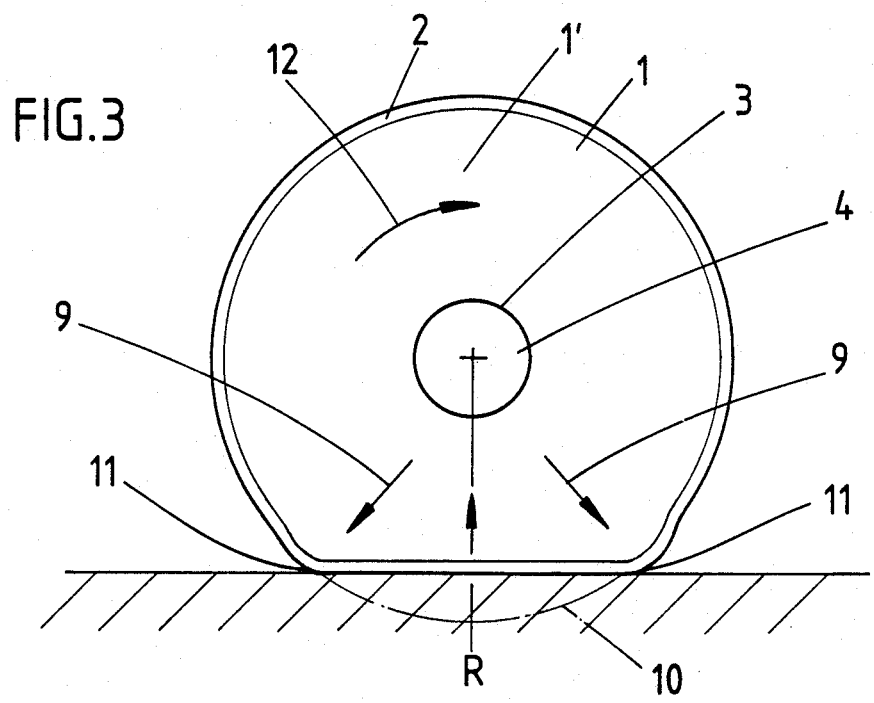
FIG. 3 is a showing corresponding to FIG. 2 in a state of contact of the transport roller.

The arrow 12 in FIG. 3 indicates the direction of rotation of the transport roller.

I claim:

1. A pressure-deformable transport roller comprising elastic material disposed about a shaft of inelastic material located in a central cavity of the elastic material, the roller including a roller body of the elastic material, the elastic material consisting of open-cell foam;

a skin of resilient material which encloses the foam and forms a cylindrical surface of the roller; and wherein the skin is anchored to the foam by engagement into pores of the foam; and the skin fully covers the foam to form a roller with a hermetically closed, completely skin-covered roller body.

2. A transport roller according to claim 1, wherein the open-cell foam consists of polyurethane and has a resistance to compression set (DIN 53 577, 40%) of 15 to 30 kPa, and the skin consists of polyurethane of a Shore A hardness of 77–83 and has an elongation upon rupture to 400%.

3. A transport roller according to claim 1, wherein a depth of anchoring of the skin in the foam pores is approximately equal to a thickness of the skin.

4. A transport roller according to claim 1, wherein the skin has projections extending into the pores of the foam forming therewith said engagement.

5. A transport roller according to claim 4, wherein the pores have various irregular shapes and narrowed surface openings formed by undercut surfaces of the foam, and the projections complementarily conform to the various shapes of the pores.

6. A transpot roller according to claim 5, wherein some of the pores which are adjacent to each other are connected by transverse shafts in which said projections engage forming coherent skin-anchoring loops.

* * * * *